Jan. 18, 1955   J. D. AKERMAN   2,700,064
SELF-HEATING WET STORAGE CELL BATTERY
Filed Dec. 22, 1950

INVENTOR.
JOHN D. AKERMAN
BY Fay, Gobrick & Fay
ATTORNEYS

United States Patent Office 2,700,064
Patented Jan. 18, 1955

2,700,064

SELF-HEATING WET STORAGE CELL BATTERY

John D. Akerman, Minneapolis, Minn.

Application December 22, 1950, Serial No. 202,309

5 Claims. (Cl. 136—161)

This invention primarily relates to self-heating wet storage batteries such as the lead acid type in which a part of the current from said battery is shunted through heating elements within the cells of the battery to maintain the temperature of the cell at or above a desired minimum in order to prevent the battery from losing part of its effectiveness due to very low electrolyte temperature.

It is well known that the capacity of lead storage batteries to discharge heavy currents reduces rapidly when the temperature of the electrolyte goes down. Also the electrolyte may freeze and rupture the battery parts at sufficiently low temperatures. Thus it may be seen that only a small percentage of the normal maximum current is available and this may be insufficient to turn over a starting motor or to operate certain other devices which may be connected to said storage cell.

This invention relates to a novel form of self-heating means consisting of heating elements within the confines of the storage cell and preferably below the level of the battery plates but somewhat above the bottom of each cell so as to avoid the sludge which may collect thereon. This heating element may be in one of several forms shortly to be described but has a particular advantage in that it is in direct contact with the sulphuric acid, thus permitting very rapid transfer of heat from the heating element to the electrolyte. This rapid transfer of heat permits the use of an unusually small, compact heating element.

An object of this invention is to provide a heating circuit for a wet storage cell within the confines of the cell which will restore that quantity of heat which is lost to the exterior and therefore maintain the temperature of the battery at or above a desired minimum.

A further object of this invention is to adapt a wet storage cell with a shunt circuit of acid resistant heating material to supply heat directly to and internally of the cells of the battery to maintain the temperature at or above a certain maximum for said battery when exposed to extreme cold conditions.

A further object of this invention is to combine in a wet storage battery a plurality of heating elements within the confines of the cells, a relay connected thereto disconnect said heating circuits from said shunt circuit and from one another, a thermostat for actuating said relay in order to raise the temperature of the battery to a desired minimum when exposed to cold weather conditions.

To the accomplishment of the foregoing and related ends, said invention, then, consists of the means hereinafter fully described and particularly pointed out in the claims; the following description setting forth in detail one approved means of carrying out the invention, such disclosed means, however, constituting but one of the various ways in which the principle of the invention may be used.

Figure 4:
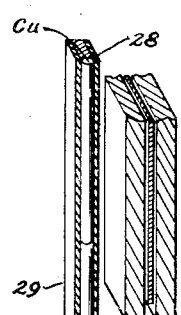
Fig. 4 is an expanded partial cross-sectional view of the heating element shown in Fig. 1.

In the drawings, 10 shows an insulated case of rubber or other materials either in composite or multiple layers with particularly good insulation properties to retain the heat of the battery within the cells. Numeral 11 is a positive plate for one of the wet storage cells. Only one plate is shown, whereas in practice the positive and negative plates are numerous and separated by wood or plastic separators one from another. The negative plate is shown at 12. Around the outside of these plates and between there and the wall of the cell is a heating element leader wire 13 on one side and 14 on the other side. This leader wire is preferably in the shape of a ribbon or at least a flattened oval in order to take up a certain minimum of space within the cell. It is true, however, that since the leader and heating wires are of such small size they need not be in this particular shape. They will not take up an unusual amount of space and will not have such a projection that the residue from the plates will accumulate on the heater. Each of these leaders to the heating is connected to a control circuit shortly to be explained. The heating elements of each cell are separately connected to this control circuit in this modification so that there will be no electrolytic action between the heating elements from one cell to another. Around the exterior surface of the vertical leader within the cell there may be a thin coating of acid-resistant plastic to protect the exterior of the wire. Across the bottom of each cell the heating element is exposed to the acid and in this instance the heating element is of thin gold, platinum or lead wire. In view of the thinness of this wire and because of the conditions to which it is subjected a support element 16 may be required. This is shown in Fig. 4. The vertical leaders 13 and 14 to this heating element are also gold, platinum or lead with a thin covering of acid-resistant plastic.

In the usual lead storage cell battery for which this invention is particularly adapted there are a number of ribs on the bottom of the cell to allow the plates of the cell to rest on these ribs away from the bottom of the cell. The residue from the plates falls into this section and accumulates. The heating wires of my invention lie in the space between these ribs and spaced from the bottom to allow for this residue. To increase the circulation of the electrolyte when the heater is on there are a multiplicity of holes in each of the ribs to allow the warm electrolyte to circulate. In this way a very simple construction is achieved which is effective and efficient.

It should be briefly explained at this point how this battery operates. When subjected to extremes of cold the temperature within the insulated case and a cover member therefor, not shown, will drop rapidly and reduce the capacity of the battery to discharge heavy currents. A thermostat is provided which is adjusted to close at a temperature high enough to avoid this reduced capacity and will shunt a part of the current of the battery through an auxiliary heater circuit shown generally at 17. Said thermostat is in physical contact with the cover of the cells to utilize the heat conductivity rate and temperature difference between the electrolyte and the thermostat. This circuit consists of a relay 18 having a plurality of contacts 19, 20, 21 and 22 for breaking the circuit to the heater of each of the individual cells in the battery. When the temperature drops, the thermostat causes the relay to close and the shunt circuit through each cell begins to heat the battery. When the temperature rises to the temperature to which the thermostat is adjusted, the circuit opens and heating stops.

Figure 2:
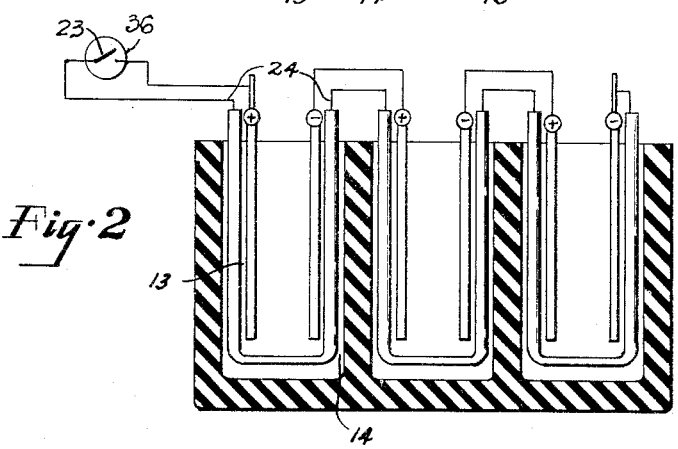
Fig. 2 is a cross-sectional view of a modified form of said heating elements and control circuits therefor.
Figure 3:
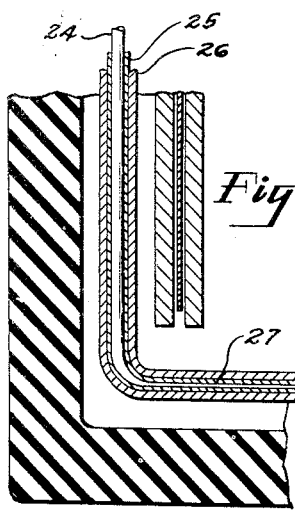
Fig. 3 is an expanded partial cross-sectional view of the heating element shown in Fig. 2.

In a modified form of the battery shown in Fig. 2 individual connections to the relay 23 are not required, as the construction of the heating elements is slightly different. In this instance Nichrome heating elements 24 of nickel and chromium are enclosed in spun glass loom 25 for electrical insulation or other high heat resistant electrical non-conductors, with a covering of lead 26. Close physical contact is provided between the heating wire, glass insulation and lead covering, thus providing good heat transfer from heater to the electrolyte. The lead covering may be only over that portion which is actually within the confines of the cell, that is, there is no lead covering between the cells. The construction of the cell is the same as previously described, with a plurality of positive and negative plates with separators therebetween and with sulphuric acid filling the battery. The leader wires 24 of copper to the bottom of the cell are of relatively large diameter, whereas across or part way across the bottom of the cell a relatively thin Nichrome wire 27, is used. In this construction, shown particularly in Fig. 3, the Nichrome wire is covered with the glass loom and then inserted in a thicker lead pipe section 26. This lead pipe 26 will then be pressed around the combination of resistance wire and glass wool. Thus the heating element will be protected from the acid by a continuous covering of lead, but the heat from the resistance wire will be in close proximity to the sulphuric acid and there will be good heat transfer through the glass loom and lead covering. Particular attention must be given that the lead tubing should not have any holes so that the electrolyte will not get into contact with the heater wires or the heating element.

The construction of the control circuit is substantially the same as previously described. As the temperature drops, the thermostat closes the shunt circuit to the heating elements and the battery is warmed to a point where the thermostat opens the circuit. In this modification a multiple pole relay is not required because there is no direct connection from one cell to another. This is so because the Nichrome and copper wires which make up the circuit are insulated from the lead coating which surrounds it by the glass wool.

Figure 1:
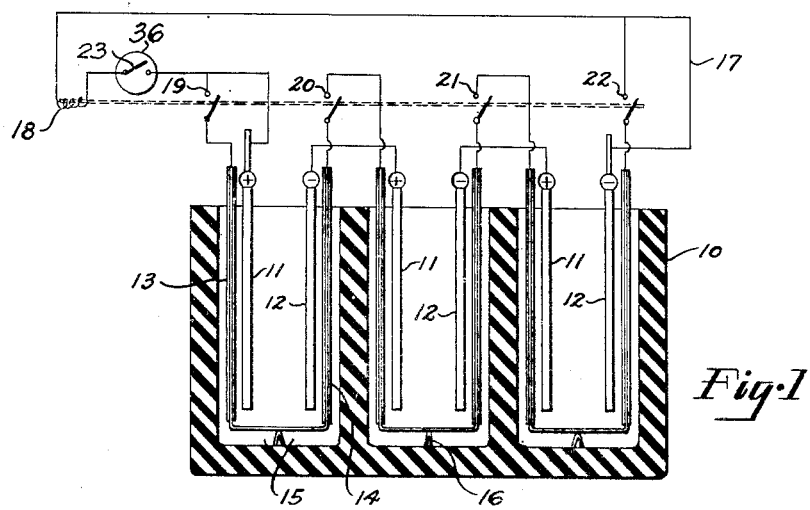
Fig. 1 is a cross-sectional view of a three-cell wet storage battery with the heating elements and electric circuits connected thereto in schematic form.

Fig. 4 is a further modification of Fig. 1 wherein gold leads are used with an exposed gold heating element. It is, of course, understood that where gold is designated other acid resistant metals, such as platinum or lead, may be employed. Gold is a convenient form and readily available for this purpose. The change in construction shown here is to provide a heavy copper leader wire 28 and spliced thereto a gold lead-in wire 29 of about the same diameter, having connected to it a thinner gold wire 30 exposed to the acid to actually heat the cell. Around the thicker sections of the lead-in wire there is an insulation material of acid resistant plastic or rubber to protect the lead-in wires from the corrosive attacks of the acid. A heavy gold section 29 is spliced to the copper section in order to prevent the possibility of local electrolytic action in the vicinity of the end of the insulation 31. The wire in this modification is supported by a rest element of insulated material 16 in the same manner as it is in Fig. 1.

Figure 5:
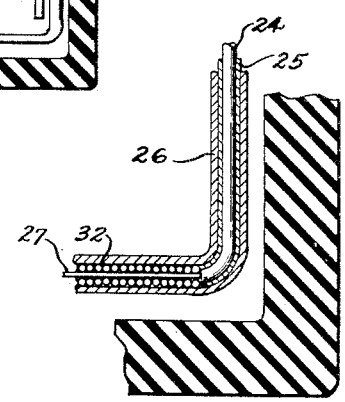
Fig. 5 is an expanded partial cross-sectional view of a modified form of the heating element shown in Fig. 2.

A further modification of Fig. 2 with its lead covered heating element is shown in Fig. 5. In this instance a heavy copper section 24 has a glass wool insulation 25 down to the beginning of the thinner Nichrome section 27. On the outer surface in the same manner as in Figs. 2 and 3 there is a lead coating 26. Over the heating element 27 there is a series of glass beads 32 contiguous one to another and between the heating element and the lead covering therefor. This acts to keep the coating of lead from contact with the Nichrome heating element but permits the dissipation of the heat to the lead and thus to the acid.

The particular need for a battery of this particular modified construction will be readily appreciated when it is seen that at low temperatures down to minus 50 or 60° F. the acid may well freeze, particularly if the battery is discharged partially and will provide very high electric resistance on the inside of the battery and will not have sufficient output—that is, starting energy, to perform its function. In addition, of course, it may not take a satisfactory charge when the electrolyte is cold.

This invention consists of provisions within the battery for shunting a portion of the battery's current to heat the battery and thus keep it in operating condition over a longer period. Of course, it is appreciated that this shunting of the current in the battery will dissipate the energy of the battery, but if the exposure to cold will cause the battery to be inoperative anyway in a short interval of time, it is better to use up part of the current and keep the battery sufficiently warm so that it may start the engine or other devices connected thereto when required. The battery may be again charged at the end of the period designated and be ready for subsequent exposure to the cold again. In order that the heat loss from the battery may be at a minimum, the casing of rubber or plastic should have an outer covering of a light compact material, such as cork or other insulations under the trade name of Sil-O-Cel or Styrofoam. It should be particularly noted that only that amount of heat need be given to the cell to replace that lost through the insulation to the surroundings.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a wet storage battery, the combination of an insulated case and cover therefor, a plurality of cells therein having positive and negative plates, an electrolyte therefor, heating elements within each of the cells, control means connected to said heating elements consisting of a temperature responsive device and a relay connected to the terminals of the battery in order to shunt a portion of the current to said heating elements, said heating elements consisting of a high resistance nickel chromium wire and leader wires of conducting material surrounded by a portion of glass wool and an outer covering of lead, said heater element being stretched across the bottom portion of said cell, the lead coating for said heater elements and leaders covering only that portion of the heating wire within the confines of the cell.

2. In a wet storage cell battery, the combination of a plurality of wet storage cells, an insulated case and cover therefor, heating elements within the cells, control means responsive to change in temperature for said heating elements, said heating elements being individually connected to said control means, said control means being connected to the terminals of the battery in order to shunt a portion of the current from said battery to the heating elements, said heating elements consisting of gold and being disposed in the bottom of the cell below the plates thereof, in order to maintain the battery in a sufficiently warm condition to be operative for a short interval of time, said heating elements, gold, having a leader to the heater of a thicker copper section, having an equally thick gold section connected thereto, said leader being insulated with an acid resistant plastic from the corrosive contact of the electrolyte, said thicker gold section avoiding the danger of electrolytic action between the copper and gold in the vicinity of the insulation.

3. The wet storage cell of claim 2 in which the heating element in the bottom portion of the cell is covered by glass beads, while that of the lead-in wire is covered with glass wool with a lead covering surrounding all of this insulation.

4. The wet storage cell of claim 2 in which the heating element in the bottom portion of the cell is covered by glass beads, while that of the lead-in wire is covered with glass wool with a lead covering surrounding all of this insulation.

5. In a wet storage cell battery, the combination of a plurality of wet storage cells, an insulated case, and cover therefor, heating elements within the cells, control means responsive to a change in temperature for said elements, said heating elements being individually connected to said control means, said control means connected to the terminals of the battery in order to shunt a portion of the current from said battery to the heating elements, said heating elements consisting of a metal resistant to the attack of the electrolyte taken from a member of the group consisting of gold, platinum, and lead, disposed in the bottom of the cell below the plates thereof, in order to maintain the battery in a sufficiently warm condition to be operative for a short interval of time.

References Cited in the file of this patent

UNITED STATES PATENTS

| | | |
|---|---|---|
| 732,616 | Burgess et al. | June 30, 1903 |
| 1,266,780 | Edison | May 21, 1918 |
| 2,157,139 | Mirick | May 9, 1939 |
| 2,418,792 | Riggs | Apr. 8, 1947 |
| 2,516,048 | Endress | July 18, 1950 |
| 2,615,933 | Carlson et al. | Oct. 28, 1952 |
| 2,626,971 | Mansoff | Jan. 27, 1953 |

FOREIGN PATENTS

| | | |
|---|---|---|
| 62,194 | Norway | Mar. 18, 1940 |